(12) United States Patent
Lim et al.

(10) Patent No.: US 9,639,153 B2
(45) Date of Patent: May 2, 2017

(54) METHOD OF CONTROLLING ELECTRONIC DEVICE USING TRANSPARENT DISPLAY AND APPARATUS USING THE SAME

(71) Applicant: ELECTRONICS AND TELECOMMUNICATIONS RESEARCH INSTITUTE, Daejeon (KR)

(72) Inventors: Jeong Mook Lim, Daejeon (KR); Hee Sook Shin, Daejeon (KR); Jong Uk Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 288 days.

(21) Appl. No.: 14/319,115

(22) Filed: Jun. 30, 2014

(65) Prior Publication Data

US 2015/0145786 A1 May 28, 2015

(30) Foreign Application Priority Data

Nov. 27, 2013 (KR) .......................... 10-2013-0145317

(51) Int. Cl.
*G06F 1/00* (2006.01)
*G06F 3/01* (2006.01)
*G06F 1/16* (2006.01)
*G06F 17/30* (2006.01)

(52) U.S. Cl.
CPC ............ *G06F 3/013* (2013.01); *G06F 1/1637* (2013.01); *G06F 1/1643* (2013.01); *G06F 1/1686* (2013.01); *G06F 3/011* (2013.01); *G06F 17/30256* (2013.01)

(58) Field of Classification Search
CPC .. G06F 3/04883; G06F 3/013; G06F 3/04815; G09G 5/00; G06T 15/00
See application file for complete search history.

(56) References Cited

U.S. PATENT DOCUMENTS

2010/0245573 A1* 9/2010 Gomi ........................ B60R 1/00
348/148
2012/0105447 A1* 5/2012 Kim ................ H04N 21/42226
345/419

FOREIGN PATENT DOCUMENTS

KR 10-2011-0136012 12/2011
KR 10-2013-0071119 6/2013

* cited by examiner

*Primary Examiner* — Michael Faragalla
(74) *Attorney, Agent, or Firm* — Staas & Halsey LLP (57) ABSTRACT

Provided are an electronic device control apparatus and method using a transparent display. The electronic device control apparatus includes a first image acquirer configured to acquire a plurality of thing-direction images respectively captured by a plurality of cameras, a virtual image generator configured to combine the plurality of thing-direction images to generate a virtual image corresponding to a thing-direction region projected on the transparent display, a user interface configured to receive a user input, and a function attribute mapper configured to recognize an object included in the virtual image, based on the user input, and map, to the virtual image, a function attribute for controlling the recognized object.

18 Claims, 8 Drawing Sheets

METHOD OF CONTROLLING ELECTRONIC DEVICE USING TRANSPARENT DISPLAY AND APPARATUS USING THE SAME

CROSS-REFERENCE TO RELATED APPLICATIONS

This application claims priority under 35 U.S.C. §119 to Korean Patent Application No. 10-2013-0145317, filed on Nov. 27, 2013, the disclosure of which is incorporated herein by reference in its entirety.

TECHNICAL FIELD

The present invention relates to a method of remotely controlling an electronic device and an apparatus using the same, and more particularly, to a method and an apparatus using the same, which control an electronic device corresponding to a recognized object by using technology which recognizes the object projected on a transparent display.

BACKGROUND

A reality displayed by a display device is divided into a full reality, which is obtained by photographing an actual world with a camera, and a virtual reality expressing a virtual world which does not exist in the actual world but is produced by a computer. As in a science fiction (SF) movie, the full reality is photographed in front of a blue screen according to a predetermined scene scenario, and there is a chroma-key reality that is obtained by combining the full reality with the virtual reality. The chroma-key reality is classified as the virtual reality.

With the continuous advancement of information technology (IT), an augmented reality (AR) that displays virtual reality data on an object in the actual world in real time has been recently proposed. The AR differs from the chroma-key reality because there is no predetermined scene scenario unlike the SF movie, and the full reality is not photographed in front of the blue screen.

In a method that determines an object for displaying virtual reality data on the full reality, the AR includes a marker type AR, which displays a marker on the full reality and recognizes the marker to display the virtual reality data on the marker, and a markerless AR that directly recognizes an object of the full reality without displaying the marker on the full reality and displays the virtual reality data. In the marker type AR, some demonstration services are being provided by using each marker, but there is no standard for a configuration of the marker. The markerless AR is not demonstrated due to instability of object recognition, except for a case of using the full reality which is obtained by photographing a predetermined object in a studio.

In the AR, examples of a method that displays virtual reality data on the full reality includes a method, which recognizes an object from the full reality (which is photographed by a camera and stored in a storage medium) in a marker/markerless scheme and displays the virtual reality data on the recognized object, and a method that which recognizes an object from the full reality (which is photographed in real time by a camera) in the marker/markerless scheme and displays the virtual reality data on the recognized object.

Due to the advancement of transparent electrodes and transparent devices, displays and touch panels become transparent, and thus, AR technology using a transparent display is being much proposed recently. That is, since digital information is displayed along with a background, by combining digital content and a background thing, a new interface is provided to a user.

In the above-described related art, AR technology using a smartphone synthesizes another digital object (user information of interest (IOI)) into a digital image, and thus enables a user to interact with an internal object of an image in a scheme such as a touch, but since an actual object is separated from a user touch space, it is difficult to provide realism. On the other hand, in AR technology using a projection device, it is possible to interact with an actual thing, but when a user is far away from a thing (generally, a distance at which a user cannot directly touch an actual thing), it is difficult to interact with the thing or project a digital object.

SUMMARY

Accordingly, the present invention provides a user interface that controls an electronic device corresponding to a recognized object by using technology which recognizes the object projected on a transparent display.

The object of the present invention is not limited to the aforesaid, but other objects not described herein will be clearly understood by those skilled in the art from descriptions below.

In one general aspect, an electronic device control apparatus using a transparent display includes: a first image acquirer configured to acquire a plurality of thing-direction images respectively captured by a plurality of cameras; a virtual image generator configured to combine the plurality of thing-direction images to generate a virtual image corresponding to a thing-direction region projected on the transparent display; a user interface configured to receive a user input; and a function attribute mapper configured to recognize an object included in the virtual image, based on the user input, and map, to the virtual image, a function attribute for controlling the recognized object.

The virtual image generator may generate the virtual image having the same size as a size of an image corresponding to the thing-direction region projected on the transparent display.

The virtual image generator may search for an overlapping region between a first thing-direction image and a second thing-direction image of the plurality of thing-direction images, and generate the virtual image which is obtained by overlapping the first thing-direction image and the second thing-direction image by a size of the overlapping region.

The virtual image generator may be activated to operate when a sum of region sizes of the plurality of thing-direction images is greater than a size of the transparent display.

The electronic device control apparatus may further include: a second image acquirer configured to acquire a plurality of user-direction images respectively captured by the plurality of cameras; and a camera driver configured to trace a user's look direction in the plurality of user-direction images, and change the photographing directions of the plurality of cameras so that an angle between the look direction and each of the photographing directions of the plurality of cameras is within a predetermined range.

The user interface may provide the user with a feedback on a result of the user input or an event which occurs in the electronic device control apparatus using the transparent display.

The function attribute mapper may transmit, as a query, a partial region of the virtual image selected based on the user input to an image search engine, and search for attribute information about an object recognized by using an object recognition result transferred from the image search engine.

The image search engine may be disposed remotely from the electronic device control apparatus using the transparent display, and may transmit and receive data over a wireless communication network.

The function attribute mapper may map the function attribute to a corresponding region, which is set by changing a position, in the virtual image.

A physical central position of the transparent display may match a center of the virtual image.

In another general aspect, an electronic device control method using a transparent display includes: acquiring a plurality of thing-direction images respectively captured by a plurality of cameras; combining the plurality of thing-direction images to generate a virtual image corresponding to a thing-direction region projected on the transparent display; and recognizing an object included in the virtual image, based on a user input, and mapping, to the virtual image, a function attribute for controlling the recognized object.

Other features and aspects will be apparent from the following detailed description, the drawings, and the claims.

DETAILED DESCRIPTION OF EMBODIMENTS

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. In the following description, the technical terms are used only for explaining a specific exemplary embodiment while not limiting the present invention. The terms of a singular form may include plural forms unless specifically mentioned.

Hereinafter, exemplary embodiments of the present invention will be described in detail with reference to the accompanying drawings. In adding reference numerals for elements in each figure, it should be noted that like reference numerals already used to denote like elements in other figures are used for elements wherever possible. Moreover, detailed descriptions related to well-known functions or configurations will be ruled out in order not to unnecessarily obscure subject matters of the present invention.

Figure 1:
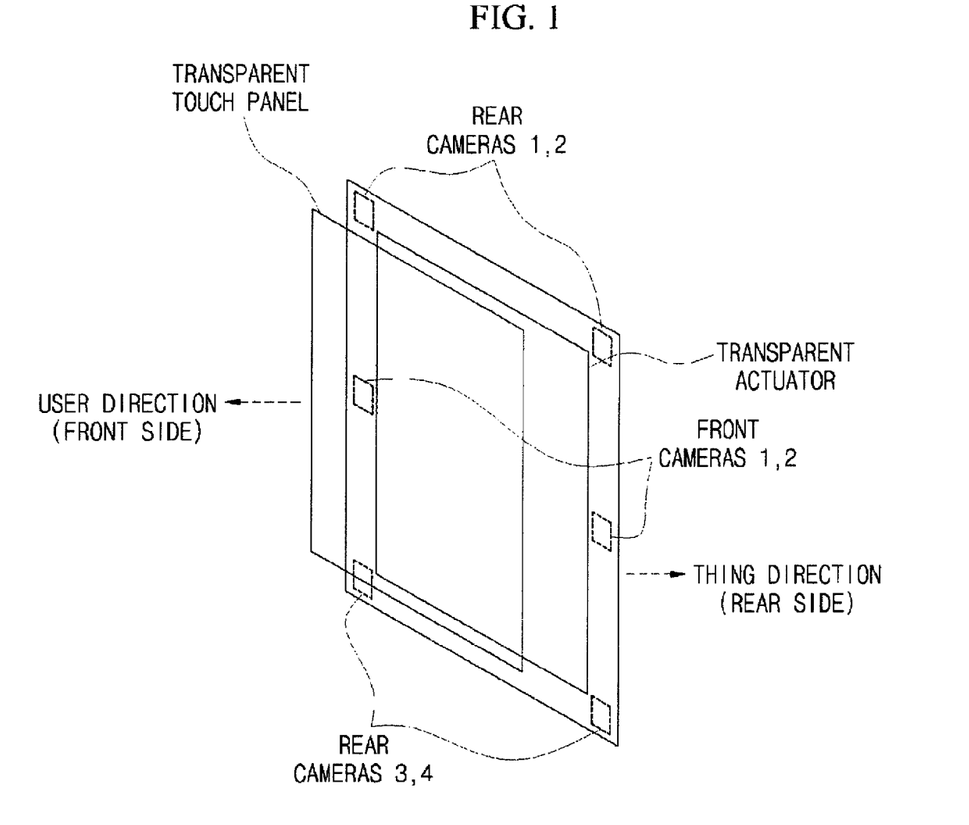
FIG. 1 is a diagram illustrating an external configuration of an electronic device control apparatus using a transparent display according to an embodiment of the present invention.

FIG. 1 is a diagram illustrating an external configuration of an electronic device control apparatus (hereinafter referred to as a control apparatus) 100 using a transparent display according to an embodiment of the present invention.

Referring to FIG. 1, the control apparatus 100 according to the present invention includes a transparent touch panel, a transparent actuator, and a camera which are integrated as one body. According to the present invention, a user interface is provided in order for a user to interact with an object which is located behind a transparent display.

To provide a detailed description, the control apparatus 100 according to the present invention may have a structure in which the transparent touch panel overlaps the transparent actuator in a user direction (a front side). Two camera lenses may be respectively disposed at both sides with respect to the center of a bezel part surrounding the transparent touch panel, in the user direction (the front side). Four camera lenses may be respectively disposed at four corners of the bezel part in a thing direction (a rear side).

In FIG. 1, it is illustrated that the four camera lenses are disposed in the thing direction, and the two camera lenses are disposed in the user direction, but those skilled in the art can induce various methods (for example, the arrangement and number of camera lenses) by referencing and/or modifying the control apparatus 100 of FIG. 1. However, the present invention includes all the induced methods, and the technical feature of the present invention is not limited to the embodiment of FIG. 1.

Hereinafter, an internal configuration of the control apparatus 100 according to the present invention and a function of each element will be described in detail with reference to FIGS. 2 to 7.

Figure 2:
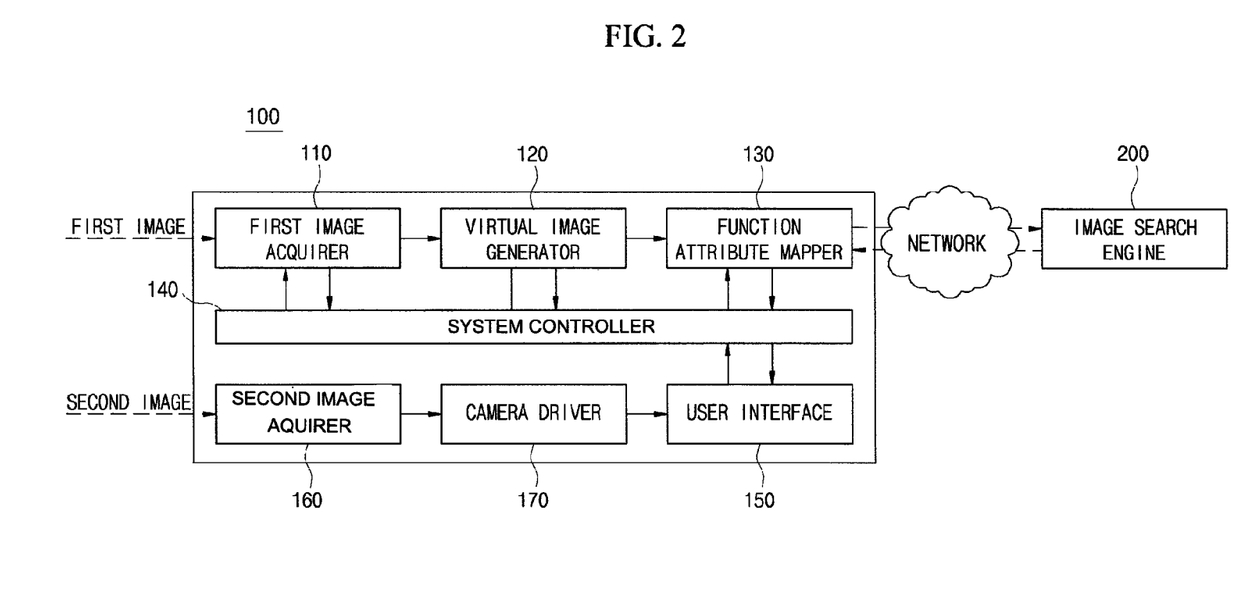
FIG. 2 is a diagram illustrating an external configuration of the electronic device control apparatus using the transparent display according to an embodiment of the present invention.

FIG. 2 is a diagram illustrating an external configuration of the electronic device control apparatus 100 using the transparent display according to an embodiment of the present invention.

Referring to FIG. 2, the control apparatus 100 according to the present invention includes a first image acquirer 110, a virtual image generator 120, a function attribute mapper 130, a system controller 140, a user interface 150, a second image acquirer 160, and a camera driver 170.

The first image acquirer 110 acquires a plurality of thing-direction images which are respectively captured by a plurality of cameras. For example, as illustrated in FIG. 1, when the four camera lenses are disposed in the thing direction, four thing-direction images may be acquired, and each of the four thing-direction images may be captured equal to a region corresponding to a viewing angle which is photographable at a position of each camera lens.

The plurality of thing-direction images acquired by the first image acquirer 110 are used to activate a virtual image generating function, and to generate the same virtual image as a thing-direction image which is projected on the transparent display, namely, is shown to a user through the transparent display. A detailed description on this will be made below.

The virtual image generator 120 combines the plurality of thing-direction images to generate a virtual image corresponding to a thing-direction region projected on the transparent display.

To provide a detailed description, the virtual image generator 120 performs functions such as function activation, processing of a thing-direction image, and generation of a virtual image. Hereinafter, a function of the virtual image generator 120 will be described in detail with reference to the accompanying drawings.

Function Activation

Figure 3:
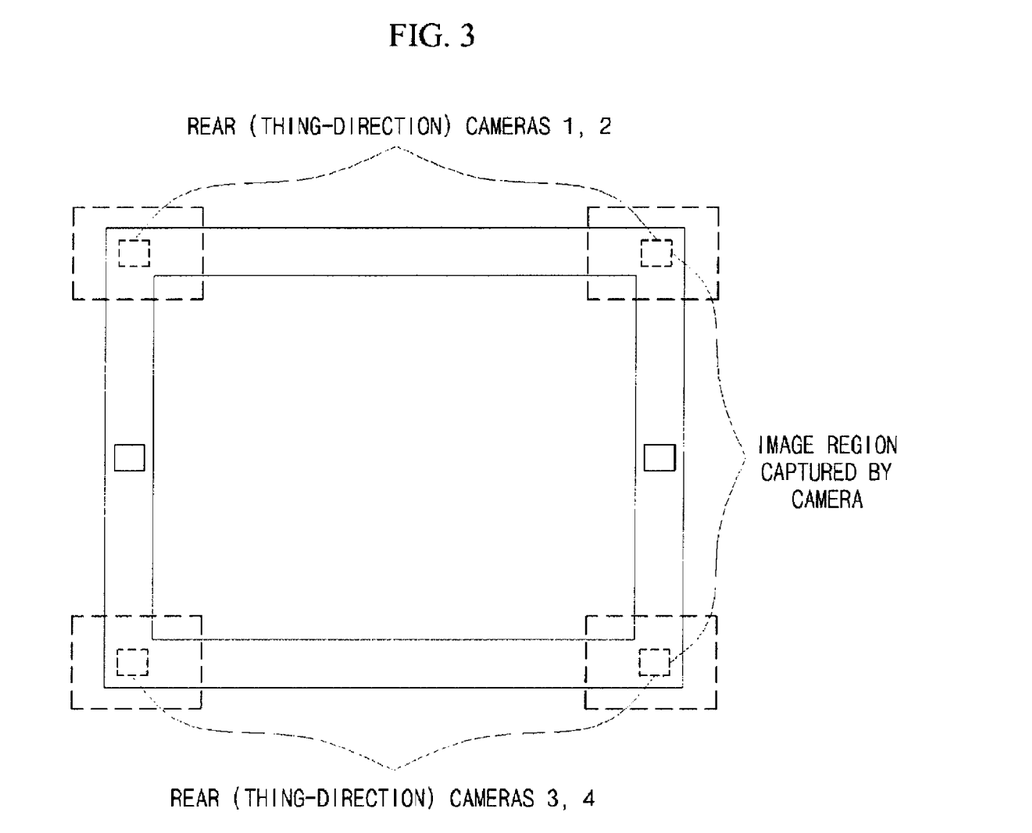
FIG. 3 is a diagram illustrating an example in which the electronic device control apparatus using the transparent display according to an embodiment of the present invention is in an inactive state.
Figure 4:
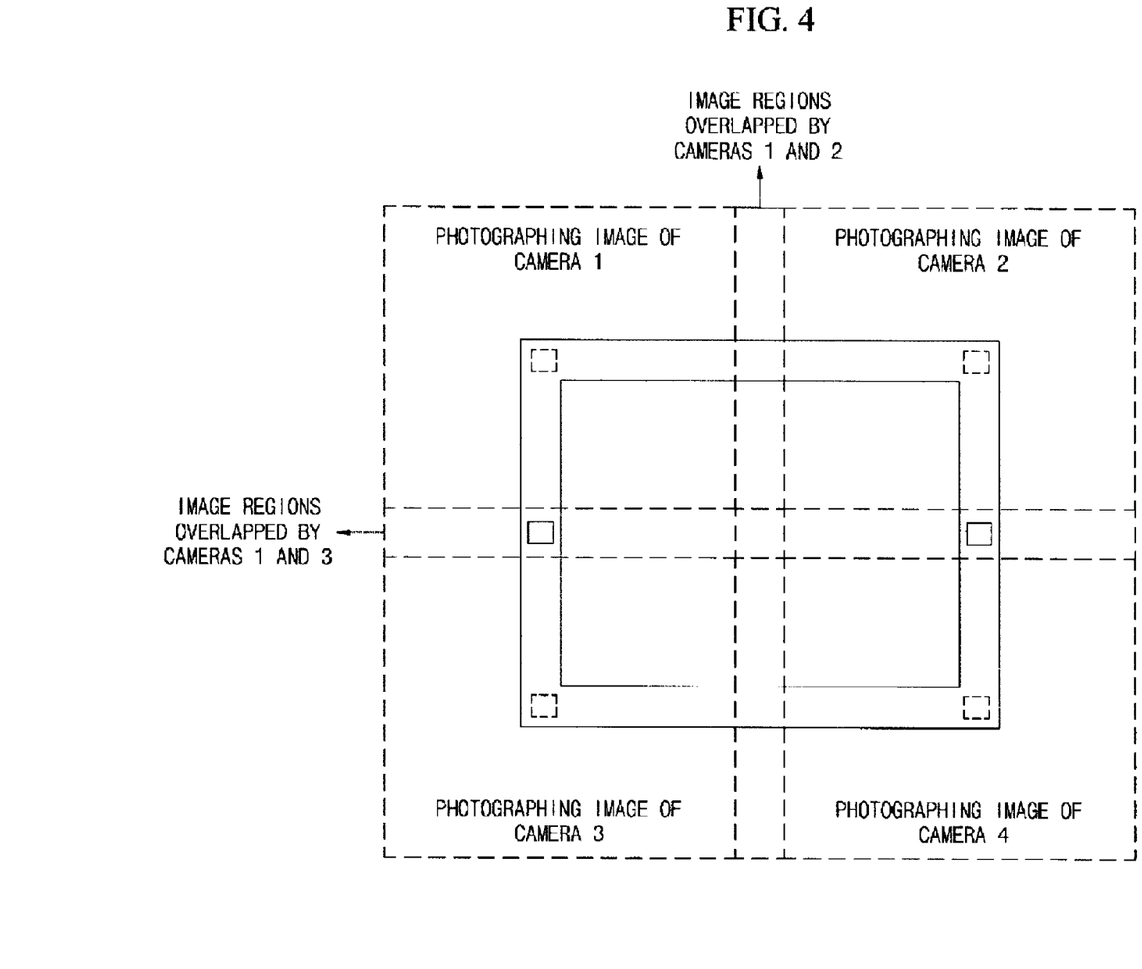
FIG. 4 is a diagram illustrating an example in which the electronic device control apparatus using the transparent display according to an embodiment of the present invention is in an active state.

FIG. 3 is a diagram illustrating an example in which the electronic device control apparatus using the transparent display according to an embodiment of the present invention is in an inactive state. FIG. 4 is a diagram illustrating an example in which the electronic device control apparatus using the transparent display according to an embodiment of the present invention is in an active state.

In FIGS. 3 and 4, tetragonal regions illustrated in an orange color indicate image regions respectively captured by the four cameras which are disposed in the thing direction. FIG. 3 illustrates a case in which an image is captured without a photographing distance being sufficiently secured.

In FIG. 3, a size of the image region captured by each of the cameras is too small, and thus, when viewing the transparent display with a user's eyes, an image of a region behind the transparent display is not secured. For example, such a case may be a case in which the transparent display is disposed on a floor. In this state, an image for identifying an object behind the transparent display viewed by the user is not secured, and thus, the virtual image generator 120 maintains an inactive state.

On the other hand, FIG. 4 illustrates a case in which an image is captured with a photographing distance being sufficiently secured. In FIG. 4, the sum of image regions (a photographing image of a camera 1, a photographing image of a camera 2, a photographing image of a camera 3, and a photographing image of a camera 4) respectively captured by the cameras is greater than a size of the transparent display. Based on the photographing distance, the sum of the photographing images starts as less than an area of the transparent display, and then becomes greater than the area of the transparent display. When the sum of the photographing images becomes greater than the area of the transparent display, the image captured by each camera has a region which overlaps a camera photographing image adjacent thereto.

For example, the images respectively captured by the cameras 1 and 2 have an overlapping region therebetween, and the images respectively captured by the cameras 1 and 3 have an overlapping region therebetween. When the sum of the photographing images is equal to or greater than the area of the transparent device, namely, when the photographing images of the respective cameras have an overlapping region therebetween, the virtual image generator 120 is activated. This defines the virtual image generator 120 as being in an initial state. The initial state denotes a state in which the object behind the transparent display viewed by the user is identified, and a peripheral thing control function using the identified object is ready.

The first image acquirer 110 periodically captures a thing-direction image until entering from a system inactive state into the initial state, and the system controller 140 determines whether the initial state is entered, based on a plurality of images (for example, four images) captured at an operating time.

Processing of Thing-Direction Image, Generation of Virtual Image

Figure 5:
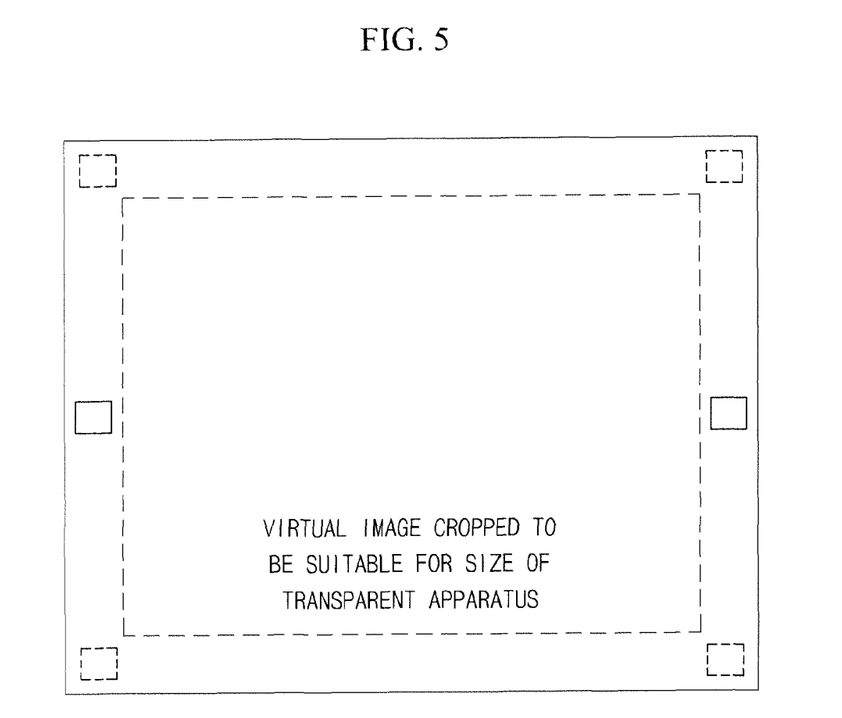
FIG. 5 is a diagram illustrating an example in which a virtual image having the same size as that of the transparent display is generated, in the electronic device control apparatus using the transparent display according to an embodiment of the present invention.

FIG. 5 is a diagram illustrating an example in which a virtual image having the same size as that of the transparent display is generated, in the electronic device control apparatus using the transparent display according to an embodiment of the present invention.

Referring to FIGS. 4 and 5, the virtual image generator 120 may generate a virtual image having the same size as that of a transparent display region. As another example, the virtual image generator 120 may generate a virtual image having the same central position as a physical central position of the transparent display.

For example, the virtual image generator 120 compares, by region having a certain size, a right region of a thing-direction image (captured by the camera 1) and a right region of a thing-direction image captured by the camera 2. That is, the virtual image generator 120 sequentially compares a portion of the right region of the thing-direction image (captured by the camera 1) and a portion of the right region (having the same size) of the thing-direction image captured by the camera 2 to determine whether the regions are the same.

When there is an overlapping region, the virtual image generator 120 generates a virtual image (hereinafter referred to as a 1+2 overlapping virtual image) which is obtained by overlapping two the images by a size of the same region.

Moreover, the virtual image generator 120 performs the same operation on images respectively captured by the cameras 3 and 4 to generate a virtual image (hereinafter referred to as a 3+4 overlapping virtual image) which is obtained by overlapping two the images by a size of an overlapping region.

Moreover, the virtual image generator 120 checks whether there is an overlapping region between the 1+2 overlapping virtual image and the 3+4 overlapping virtual image, and when there is the overlapping region, the virtual image generator 120 generates an overlapping virtual image (hereinafter referred to as a 1+2+3+4 overlapping virtual image) in the above-described way.

The virtual image generated by the above-described way needs not to perform separate position calibration because the center of the virtual image is always the same as a physical central position of the transparent display. Therefore, when a user looks at the thing direction from the center of the transparent display in a direction vertical to the transparent display, the virtual image is the same as an image (a projected image) which is viewed by the user through the transparent display.

Since the 1+2+3+4 overlapping virtual image generated by the above-described way is greater than a region which is viewed by the user through the transparent display, the virtual image generator 120 generates, as a final virtual image (a cropped image), an image which is obtained by cropping a region other than a region occupied by the transparent display in the 1+2+3+4 overlapping virtual image. In this case, as described above, the final virtual image has the same size as that of an image corresponding to a thing-direction image projected on the transparent display, and has the same center as the physical central position of the transparent display.

As described above, when generation of the same virtual image as the transparent display is completed, the user interface 150 may provide the user with a haptic feedback on a system initial state.

The user interface 150 may provide an interface (for example, a touch interface) receiving a user input, or provide the user with a feedback on a result of the user input or an event which occurs in the electronic device control apparatus using the transparent display.

The function attribute mapper 130 recognizes an object included in a virtual image, based on the user input received by the user interface 150, and maps a function attribute, which is used to control the recognized object, to the virtual image.

Figure 6:
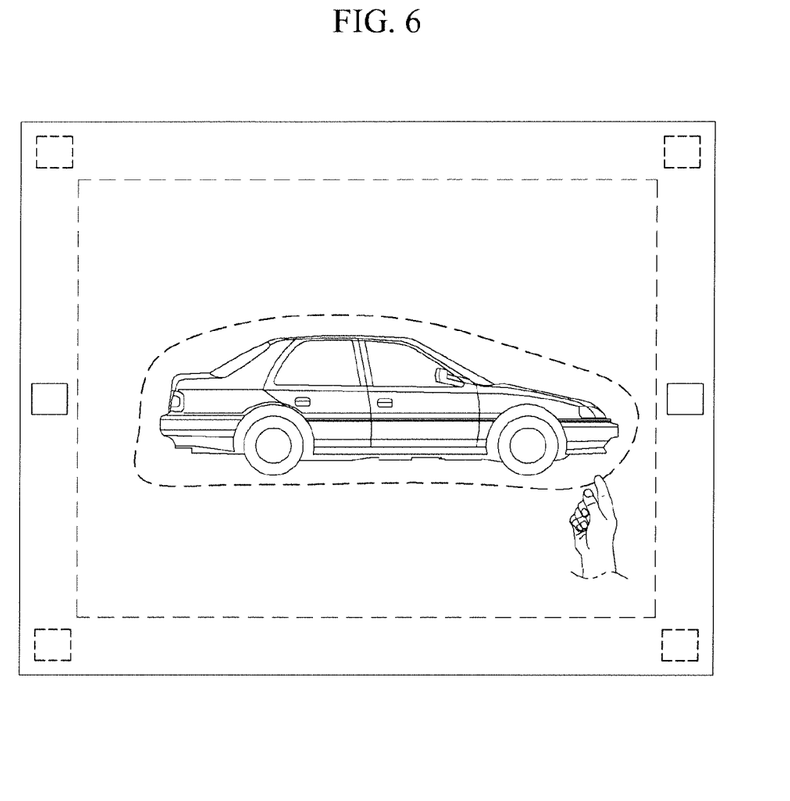
FIG. 6 is a diagram illustrating an example in which an object of interest (OOI) region is selected, in the electronic device control apparatus using the transparent display according to an embodiment of the present invention.
Figure 7:
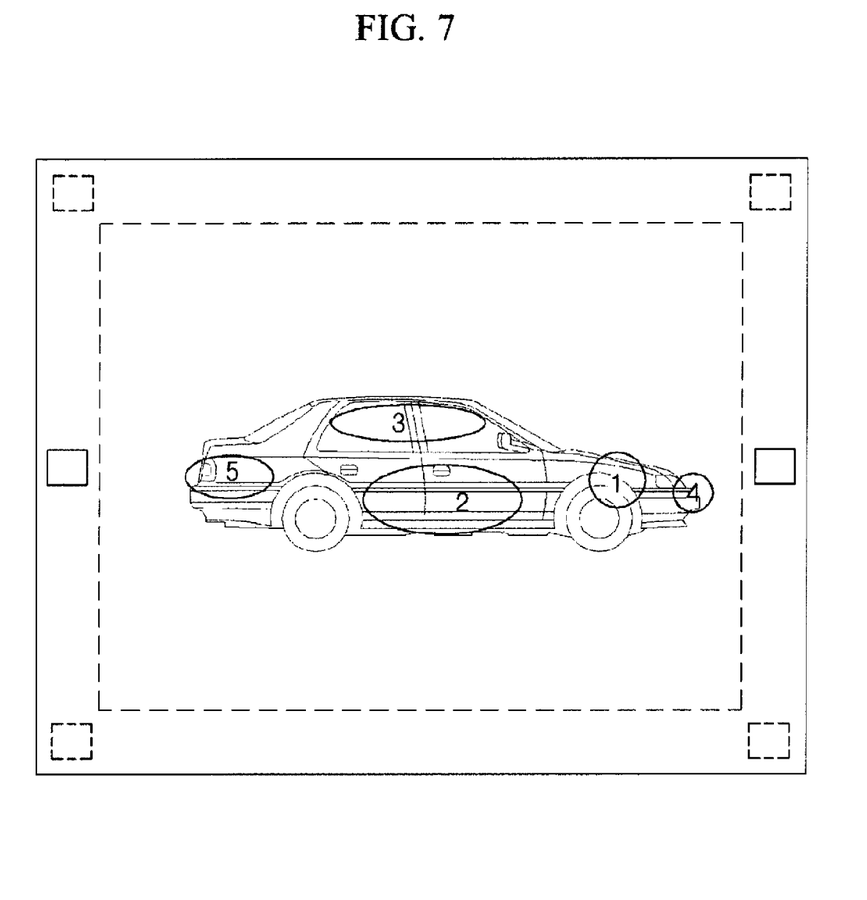
FIG. 7 is a diagram illustrating an example in which an object function attribute is mapped, in the electronic device control apparatus using the transparent display according to an embodiment of the present invention.

FIG. 6 is a diagram illustrating an example in which an object of interest (OOI) region is selected, in the electronic device control apparatus using the transparent display according to an embodiment of the present invention. FIG. 7 is a diagram illustrating an example in which an object function attribute is mapped, in the electronic device control apparatus using the transparent display according to an embodiment of the present invention.

Referring to FIGS. 6 and 7, when a user selects an object behind the transparent display through a touch gesture, the user interface 150 may select a specific object included in a virtual image according to a touched position.

The specific object, as illustrated in FIG. 6, may be selected by drawing a polygonal shape around the specific object. The control apparatus 100 according to the present invention uses, as-is, a thing-direction image projected on the transparent display without including a display module which provides a visual feedback, and thus, when the user selects the object through the touch gesture, the control apparatus 100 may distinguish an intermediate stage of drawing the polygonal shape from a stage in which the selection of the object is completed, and provide the user with a haptic feedback corresponding to each of the stages.

The function attribute mapper 130 maps a finally generated virtual image and the touch gesture to regard a portion of the virtual image, selected by the touch gesture, as a user's object of interest (OOI), and transmits the OOI as a query of the image search engine 200.

The image search engine 200 transfers a search result (attribute information of the user's OOI), which is obtained through a search based on an image slice regarded as the user's OOI, to the control apparatus 100.

Here, the image search engine 200 may be included in the control apparatus 100 according to the present invention, in which case the function attribute mapper 130 and the image search engine 200 transmit and receive data in an internal data communication scheme.

On the other hand, the image search engine 200 may be disposed remotely from the control apparatus 100, and transmit and receive data over a wireless communication network.

As in FIG. 7, for example, when an object viewed by the user through the transparent display is a vehicle, the function attribute mapper 130 receives a search result "vehicle" (which is obtained by searching for an image) from the image search engine 200, and maps a providable function to a virtual image according to an attribute of a predetermined object "vehicle".

The function attribute mapper 130 stores position information of an object selected by the user, and thus may apply a function, which is providable in a currently selected object, to a specific position of the object corresponding to a corresponding function.

In the object "vehicle", a function list may include 1) hood-ignition ON/OFF, 2) door-door open/close, 3) window-window lowering/raising, 4) headlight-headlight ON/OFF, and 5) trunk-trunk open/close. When a virtual image is completely mapped to an object function attribute, the user interface 150 provides a haptic feedback to the user.

In a case of a simple object (which provides a simple function such as blind, illumination, door, or the like) in addition to a complex object which provides various functions as in the object "vehicle", it is possible to control a function by using a metaphor of the object itself without a separate graphics user interface (GUI). That is, in a case of the blind, the blind may be lowered or raised by only a simple gesture, such as left and right or upward and downward flicking or clicking, even without providing the separate GUI to the user through the transparent display. That is, in a case of a simple object disposed at a position which the user's hand cannot reach, the user may identify the object by using the control apparatus 100 using the transparent display, and the control apparatus 100 held by the user's hand may provide a control panel for the object without the separate GUI.

The user selects an object, which is identified through user interface 150, and a function of the object, and by using a short-distance network established between the object and the control apparatus 100 using the transparent display, a command suitable for the function is transmitted from the control apparatus 100 to the object, thereby performing a function desired by the user.

The system controller 140 overall control operations of the first image acquirer 110, the virtual image generator 120, the function attribute mapper 130, the system controller 140, the user interface 150, the second image acquirer 160, and the camera driver 170, or defines an organic relationship between the elements.

For example, the system controller 140 may determine whether to activate a function of the virtual image generator 120, or trace the user's look direction in a user-direction image acquired by the second image acquirer 160 to generate a command for controlling the operation of the camera driver 170.

The second image acquirer 160 acquires a plurality of user-direction images respectively captured by the plurality of cameras. For example, as illustrated in FIG. 1, when two camera lenses are disposed in the user direction, two user-direction images captured equal to a region (corresponding to a viewing angle which is photographable at a position of each camera lens) may be acquired.

The control apparatus 100 using the transparent display has a size which enables the user to hold and use the control apparatus 100 with one hand as in smartphones, and thus, the user easily disposes the transparent display to be close to a direction vertical to the user.

However, when a position of the user's eyes (or head) deviates from the user direction within a normal range, two cameras disposed in the user direction may trace the position of the user's eyes (or head), and a photographing direction of a camera disposed in the thing direction may be adjusted in consideration of the position of the user's eyes (or head).

As described above, the camera driver 170 traces the user's look direction in the user-direction image acquired by the second image acquirer 160, and calculates a control value for adjusting the photographing direction of the camera so that an angle between the look direction and the photographing direction of the camera disposed in the thing direction is within a predetermined range. Therefore, the camera driver 170 adjusts the photographing direction of the camera.

For example, when it is assumed that a plane of the transparent display is an X-Y plane and a vertical direction to the user side is a Z axis in the transparent display, a three-dimensional (3D) space with the center "p0=(x0, y0, z0)" of the transparent display as the origin may be generated.

When the position of the user's eyes (or head) is "p1=(x1, y1, z1)", a normal range denotes a Euclid distance of (x0, y0) and (x1, y1) being within an appropriate threshold value. When the position of the user's eyes (or head) deviates from the normal range, the user changes directions of the four cameras disposed in the thing direction so that the four cameras are disposed on the same straight line as that of the user's eyes (or head) according to an angle (an angle between a straight line "p1p0" and the X-Y plane (the transparent display)) at which the user views the transparent display. A method of tracing a user's eyes or head by using a plurality of cameras is well known, and thus, its detailed description is not provided.

In the method according to the present invention which identifies a thing behind the transparent display without the display module, the plurality of cameras are provided in the transparent display, images respectively captured by the plurality of cameras are recombined, and a region viewed by a user through the transparent apparatus is generated as a virtual image. This will be described in detail with reference to FIG. 8.

Figure 8:
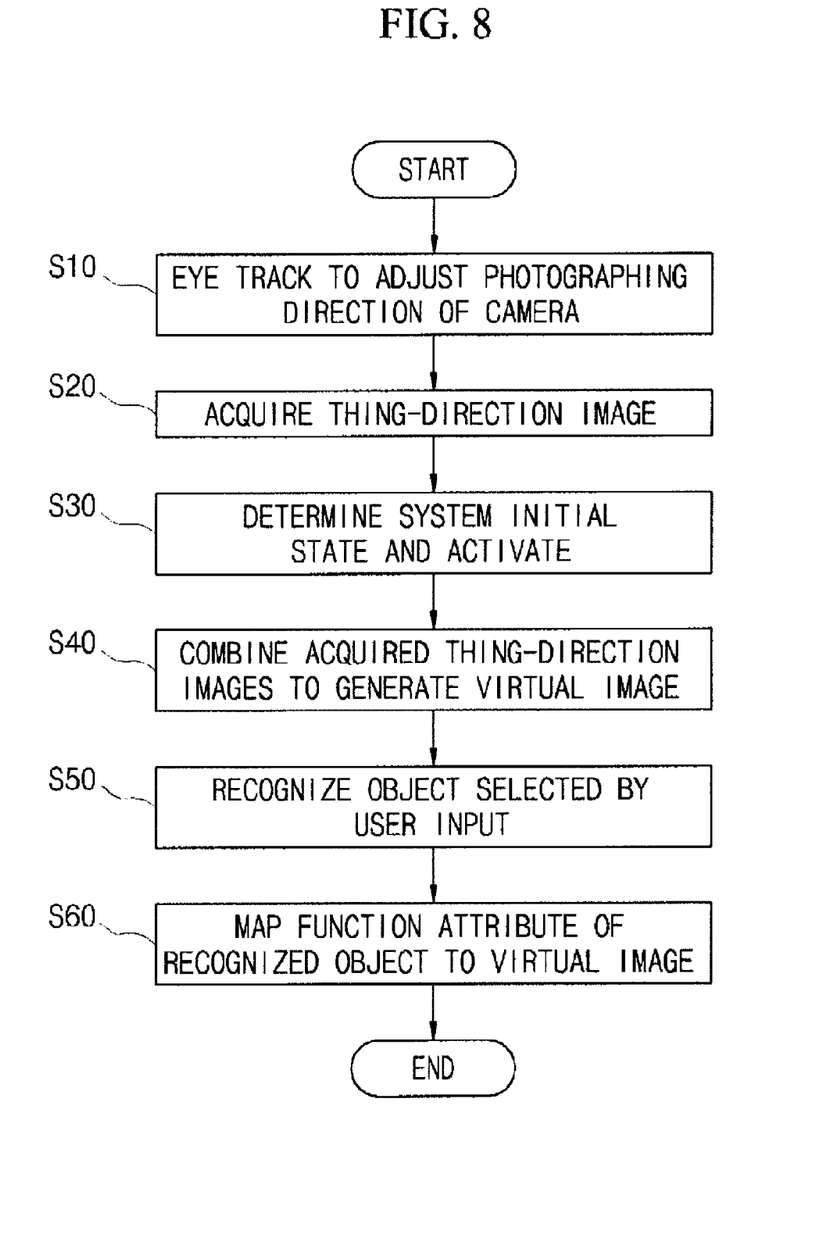
FIG. 8 is a flowchart illustrating an electronic device control method using the transparent display according to an embodiment of the present invention.

FIG. 8 is a flowchart illustrating an electronic device control method using the transparent display according to an embodiment of the present invention.

Referring to FIG. 8, in operation S10, the control apparatus traces a user's look direction in an image captured by a camera which is disposed in a user direction, and adjusts a photographing direction of the camera disposed in a thing direction according to an angle between the user's look direction and the transparent display.

Subsequently, in operation S20, the control apparatus acquires a plurality of images respectively captured by a plurality of cameras which are disposed in the thing direction.

In operation S30, the control apparatus periodically captures the plurality of images until the control apparatus enters from the inactive state into the initial state, and determines whether the initial state is entered, based on a plurality of images (for example, four images) captured at an operating time.

In operation S40, when the system enters the initial state, the control apparatus combines the plurality of thing-direction images to generate a virtual image corresponding to a thing-direction region projected on the transparent display.

Subsequently, the control apparatus recognizes an object included in the virtual image on the basis of a user input in operation S50, and maps, to the virtual image, a function attribute for controlling the recognized object in operation S60.

In an embodiment, when an OOI is displayed by the transparent touch panel according to a user's touch gesture, the user's OOI region may be cropped from a virtual image on the basis of the touch gesture. A region regarded as the user's OOI is set by the touch gesture, and an image is searched based on the set region to acquire attribute values such as a name of an object, a function list, etc. The function list which is providable by the object from the acquired attribute values is mapped to the virtual image, and a corresponding function is controlled by the touch gesture.

As described above, a plurality of photographing images are combined by using a plurality of cameras disposed in a thing direction which is viewed by a user, and a virtual image is calibrated to have the same size as that of the transparent display, thereby easily generating the same virtual image as a user view which is viewed by the user through the transparent display. Also, since the center of the touch panel matches the center of the virtual image, a partial image of a position touched by the user can be easily obtained by using the touch panel without separate calibration. Predetermined attribute information about the user's OOI can be obtained by using the partial image as a query of the image search engine.

Unlike the existing AR service, the present invention can recognize an object projected on the transparent display and control a function of an electronic device corresponding to the recognized object, even without including a display module that synthesizes data (sensed by an image sensor) into digital image information.

In particular, since the center of the transparent display matches the center of an augmented virtual image, the present invention adjusts only a size of an image according to a photographing ratio of a camera without complicated calibration, and thus, a user can easily obtain a viewing image by using the transparent display.

The control method according to the present invention may also be embodied as computer-readable codes on a computer-readable recording medium. The computer-readable recording medium is any data storage device that may store data which may be thereafter read by a computer system. Examples of the computer-readable recording medium include read-only memory (ROM), random access memory (RAM), CD-ROMs, magnetic tapes, floppy disks, and optical data storage devices. The computer-readable recording medium may also be distributed over network coupled computer systems so that the computer-readable code may be stored and executed in a distributed fashion.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An electronic device control apparatus using a transparent display, the electronic device control apparatus comprising:
   a first image acquirer configured to acquire a plurality of thing-direction images respectively captured by a plurality of cameras;
   a virtual image generator configured to combine the acquired plurality of thing-direction images to generate a virtual image corresponding to a thing-direction region that is projected on the transparent display;
   a user interface configured to receive a user input; and
   a function attribute mapper configured to recognize an object included in the generated virtual image, based on the user input, and map, to the generated virtual image, a function attribute for controlling the recognized object, wherein the function attribute mapper transmits, as a query, a partial region of the virtual image selected based on the user input to an image search engine, and searches for attribute information about an object recognized by using an object recognition result transferred from the image search engine.

2. The electronic device control apparatus of claim 1, wherein the virtual image generator generates the virtual image having the same size as a size of an image corresponding to the thing-direction region projected on the transparent display.

3. The electronic device control apparatus of claim 1, wherein the virtual image generator searches for an overlapping region between a first thing-direction image and a second thing-direction image of the plurality of thing-direction images, and generates the virtual image which is obtained by overlapping the first thing-direction image and the second thing-direction image by a size of the overlapping region.

4. The electronic device control apparatus of claim 1, wherein the virtual image generator is activated to operate when a sum of region sizes of the plurality of thing-direction images is greater than a size of the transparent display.

5. The electronic device control apparatus of claim 1, further comprising:
a second image acquirer configured to acquire a plurality of user-direction images respectively captured by the plurality of cameras; and
a camera driver configured to trace a user's look direction in the plurality of user-direction images, and change the photographing directions of the plurality of cameras so that an angle between the look direction and each of the photographing directions of the plurality of cameras is within a predetermined range.

6. The electronic device control apparatus of claim 1, wherein the user interface provides the user with a feedback on a result of the user input or an event which occurs in the electronic device control apparatus using the transparent display.

7. The electronic device control apparatus of claim 1, wherein the image search engine is disposed remotely from the electronic device control apparatus using the transparent display, and transmits and receives data over a wireless communication network.

8. The electronic device control apparatus of claim 1, wherein the function attribute mapper maps the function attribute to a corresponding region, which is set by changing a position, in the virtual image.

9. The electronic device control apparatus of claim 1, wherein a physical central position of the transparent display matches a center of the virtual image.

10. An electronic device control method using a transparent display, the electronic device control method comprising:
acquiring a plurality of thing-direction images respectively captured by a plurality of cameras;
combining the acquired plurality of thing-direction images to generate a virtual image corresponding to a thing-direction region that is projected on the transparent display; and
recognizing an object included in the generated virtual image, based on a user input, and mapping, to the generated virtual image, a function attribute for controlling the recognized object,
wherein the mapping of a function attribute comprises:
transmitting, as a query, a partial region of the virtual image selected based on the user input to an image search engine, and
searching for attribute information about an object recognized by using an object recognition result transferred from the image search engine.

11. The electronic device control method of claim 10, wherein the generating of a virtual image comprises searching for an overlapping region between a first thing-direction image and a second thing-direction image of the plurality of thing-direction images, and generating the virtual image which is obtained by overlapping the first thing-direction image and the second thing-direction image by a size of the overlapping region.

12. The electronic device control method of claim 10, wherein the generating of a virtual image comprises generating the virtual image having the same size as a size of an image corresponding to the thing-direction region projected on the transparent display.

13. The electronic device control method of claim 10, wherein the generating of a virtual image comprises generating the virtual image having the same center as a physical central position of the transparent display.

14. The electronic device control method of claim 10, wherein the generating of a virtual image comprises:
searching for an overlapping region between a first thing-direction image and a second thing-direction image of the plurality of thing-direction images, and generating an auxiliary virtual image which is obtained by overlapping the first thing-direction image and the second thing-direction image by a size of the overlapping region; and
generating, as a final virtual image (a cropped image), an image which is obtained by cropping a region other than a region occupied by the transparent display in the auxiliary virtual image.

15. The electronic device control method of claim 10, further comprising: before the generating of a virtual image,
acquiring a plurality of user-direction images respectively captured by the plurality of cameras; and
tracing a user's look direction in the plurality of user-direction images, and changing the photographing directions of the plurality of cameras so that an angle between the look direction and each of the photographing directions of the plurality of cameras is within a predetermined range.

16. The electronic device control method of claim 15, further comprising performing activation when a sum of region sizes of the plurality of thing-direction images is greater than a size of the transparent display.

17. The electronic device control method of claim 10, wherein the mapping of a function attribute comprises mapping the function attribute to a corresponding region, which is set by changing a position, in the virtual image.

18. The electronic device control method of claim 10, wherein the image search engine is disposed remotely from the electronic device control apparatus using the transparent display, and transmits and receives data over a wireless communication network.

* * * * *